(12) United States Patent
Bernhardt et al.

(10) Patent No.: US 9,091,296 B2
(45) Date of Patent: Jul. 28, 2015

(54) CABLE ASSEMBLY

(71) Applicant: CABLE MANUFACTURING & ASSEMBLY, INC., Bolivar, OH (US)

(72) Inventors: Eric M. Bernhardt, Akron, OH (US); Claude D. Ousley, Bolivar, OH (US); Werner H. Steuernagel, Green Cove Springs, FL (US)

(73) Assignee: Cable Manufacturing & Assembly, Inc., Bolivar, OH (US)

( * ) Notice: Subject to any disclaimer, the term of this patent is extended or adjusted under 35 U.S.C. 154(b) by 85 days.

(21) Appl. No.: 14/021,171

(22) Filed: Sep. 9, 2013

(65) Prior Publication Data
US 2015/0068356 A1  Mar. 12, 2015

(51) Int. Cl.
*F16C 1/10* (2006.01)
*F16C 1/20* (2006.01)

(52) U.S. Cl.
CPC ...................................... *F16C 1/205* (2013.01)

(58) Field of Classification Search
USPC ................. 74/489, 500.5, 502.5; 464/51, 55; 57/219, 230
See application file for complete search history.

(56) References Cited

U.S. PATENT DOCUMENTS

| 3,922,882 | A | * | 12/1975 | Kimata | 464/7 |
| 6,338,287 | B1 | * | 1/2002 | Uneme et al. | 74/502.5 |
| 6,646,204 | B2 | * | 11/2003 | Chaon et al. | 174/105 R |
| 2010/0116084 | A1 | * | 5/2010 | Steuernagel | 74/502.5 |

FOREIGN PATENT DOCUMENTS

EP  127185 A1 * 12/1984  .............. F16C 1/10

* cited by examiner

*Primary Examiner* — Vicky Johnson
(74) *Attorney, Agent, or Firm* — Sand & Sebolt

(57) ABSTRACT

The invention relates to a cable assembly. Specifically, the cable assembly includes a segment having a first cable and a second cable. The first cable defines an inner channel. The second has a non-circular cross-sectional shape and is slidably disposed in the inner channel. The non-circular cross-sectional shape of the second cable may improve the frictional coefficient between the first cable and the second cable.

20 Claims, 7 Drawing Sheets

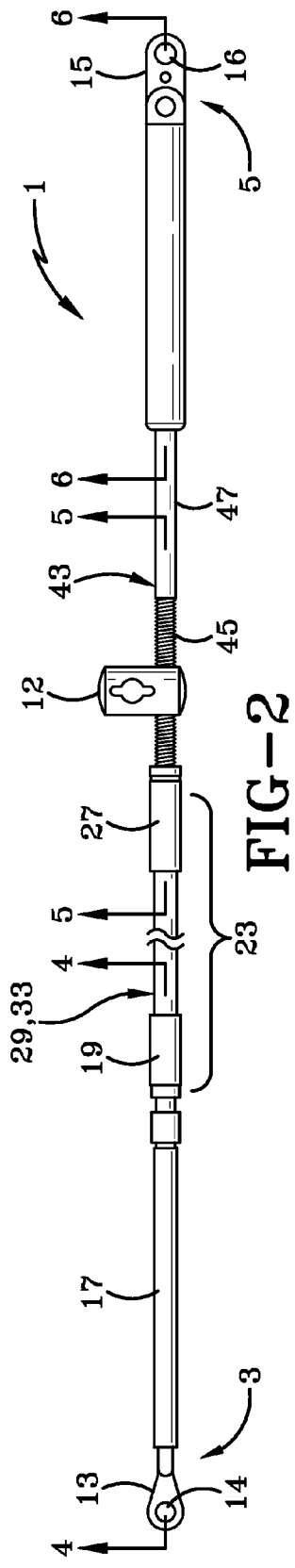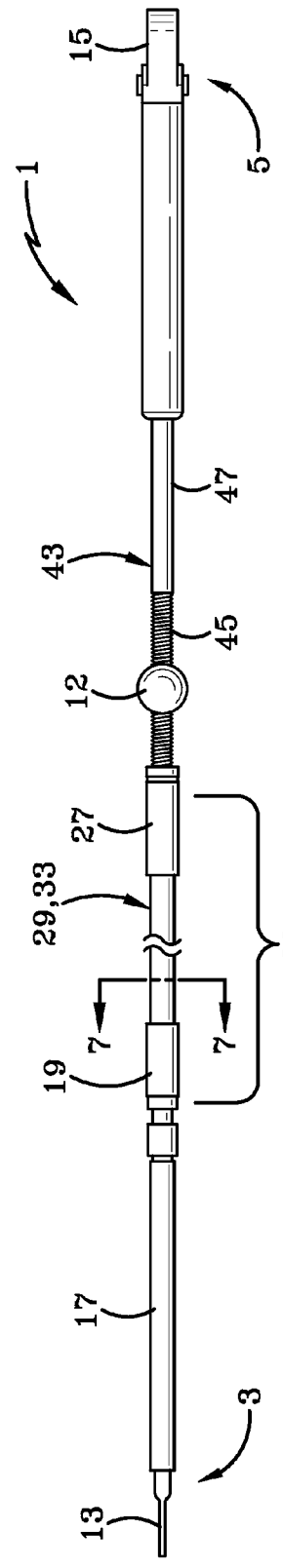

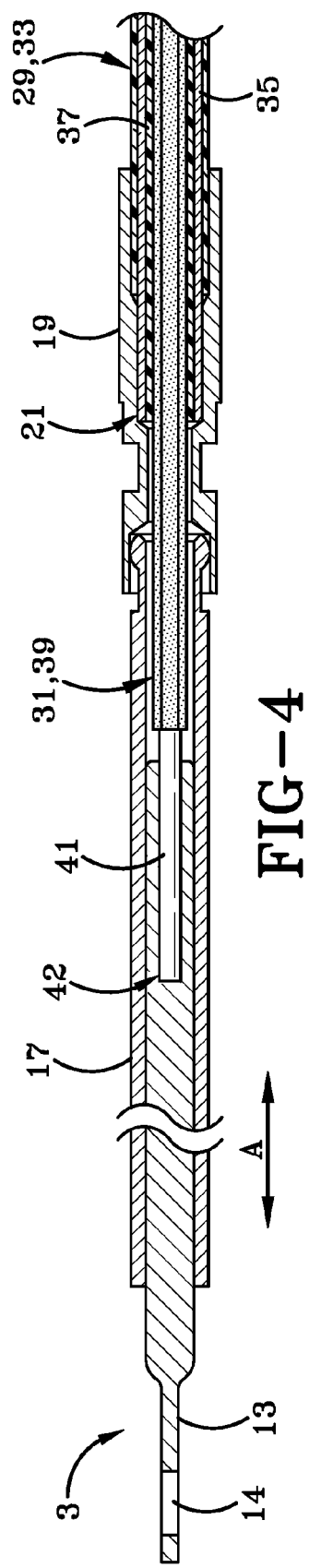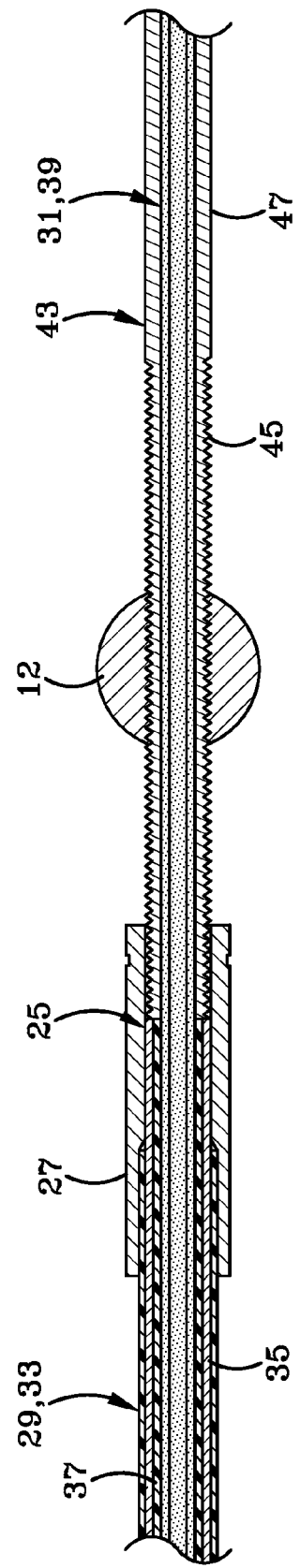

CABLE ASSEMBLY

BACKGROUND OF THE INVENTION

1. Technical Field

This invention relates to a cable assembly for use in connecting a throttle assembly to an engine assembly. More particularly, this invention relates to a cable assembly having a segment which includes one cable slidably disposed within another cable. Specifically, this invention relates to a first cable segment and a second cable segment having a generally non-circular cross-sectional shape, wherein the second cable segment is slidably disposed in the first cable segment.

2. Background Information

Vehicles such as a boat typically locate an operator in the middle of the vehicle for optimal awareness and a 360-degree view of the vehicle. However, vehicles such as a boat locate the engine assembly in the rear of the vehicle for efficient propulsion of the vehicle. This presents a problem in that there is a significant separation of the controls from the engine.

Heretofore engineers have addressed this separation with mechanical elongated cable assemblies having an internal chamber for sliding one cable within another cable to actuate the engine via this movement. However, the length of the cable assembly and the materials used results in a very problematic frictional coefficient between the sliding elements. Thus, a user must physically push or pull relatively hard on the control element, typically a throttle assembly, to actuate the engine. Fine engine control is not available in the present systems due to the force required to overcome the internal friction and move the cable assembly element to actuate the engine. A user must settle for a boat moving slightly faster or slightly slower than desired because of this absence of fine engine control. Conversely, skiers or other athletes or water sports enthusiasts typically have a desired speed with which they prefer to perform their activities. Thus, there is a tremendous need in the art for providing a finer degree of engine control to an operator of a vehicle such as a boat. At present, this fine engine control is limited by the nature of the cable assembly.

The problematic frictional coefficient in modern cable assemblies presents another problem in that the friction results in a tremendous amount of wear on the elements. This wear leads to failure of the cable assembly. Failure of the cable assembly during use can be catastrophic in that the user may lose the ability to control the moving vehicle. As such, vehicle owners are aware of the frictional wear problem and replace control assemblies frequently. However, replacement of a cable assembly is non-trivial in that the entire cable assembly needs removed from the throttle assembly to the engine assembly. Thereafter, a new cable assembly is installed, securing the entire length from the throttle assembly to the engine assembly. Still further, the user must then spend a considerable amount of time configuring and tuning the relationship between the engine assembly and the throttle assembly via the cable assembly to ensure a neutral position of the throttle results in the engine moving to the idle state, forward position of the throttle results in a forward propulsion of the engine, etc. Thus, there is a tremendous need in the art for providing a longer lasting and wear-resistant cable assembly.

SUMMARY

In one aspect, the invention may provide a cable assembly extending from a first end to a second end and including: a first cable, wherein the first cable defines an inner channel; a second cable slidably disposed in the inner channel; and wherein the second cable includes a generally non-circular cross-sectional shape.

In another aspect, the invention may provide a method for forming a cable assembly comprising the steps of: forming an inner channel inside a first cable; disposing a second cable having a non-circular cross-sectional shape inside the inner channel; and sliding the second cable in the inner channel.

In another aspect, the invention may provide a segment of a cable assembly, the segment including: a first cable having a first cross-sectional shape; an inner channel defined by the first cable; a second cable having a second cross-sectional shape, wherein the second cable is slidably disposed in the inner channel; and wherein the first cross-sectional shape and the second cross-sectional shape are different.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

FIG. 2 is a side profile view of the cable assembly of the present invention;

FIG. 3 is a side profile view thereof;

FIG. 4 is a cross-sectional view taken along line 4-4 of FIG. 2;

FIG. 5 is a cross-sectional view taken along line 5-5 of FIG. 2;

Similar numbers refer to similar parts throughout the drawings.

DETAILED DESCRIPTION

Figure 1:
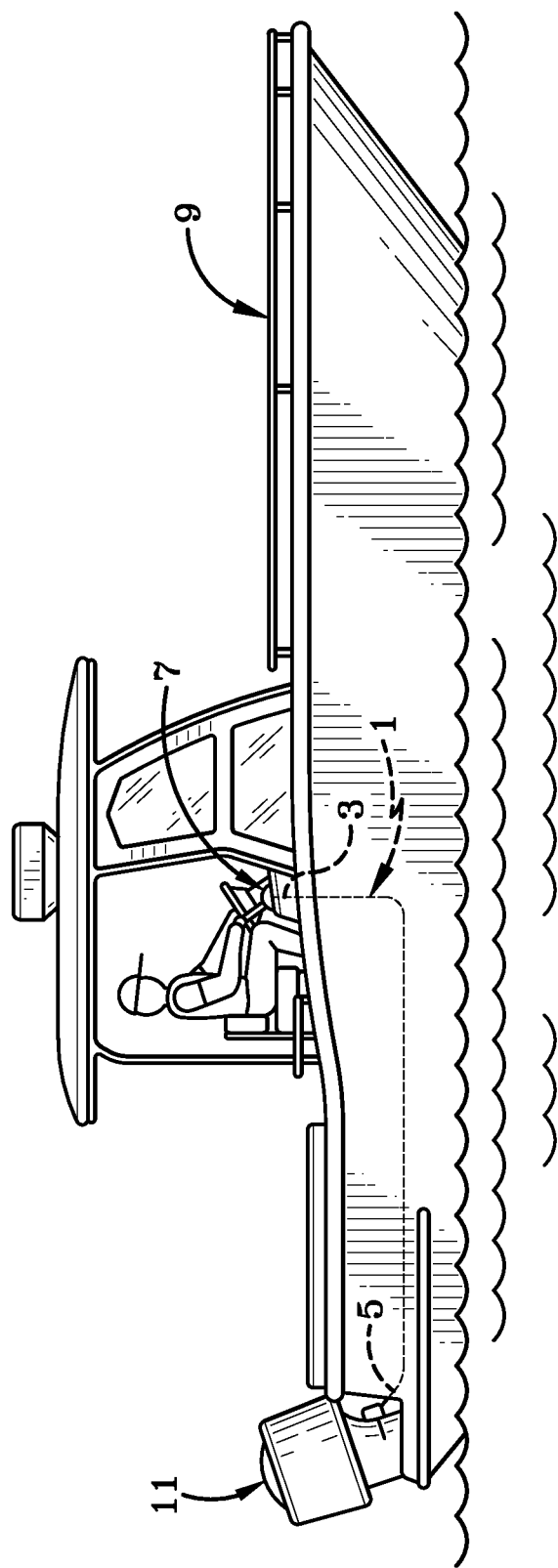
FIG. 1 is a side perspective view of a boat having a cable assembly of the present invention shown in dashed lines.

A cable assembly relating to the present invention is generally indicated at 1 and shown in FIGS. 1-9. A method relating to the present invention is generally described herein and shown in FIGS. 1-9. As shown in FIG. 1, cable assembly 1 generally extends from a first end 3 to a second end 5. First end 3 is adapted to connect to a throttle assembly 7 of a vehicle, typically a boat 9. Second end 5 is adapted to connect to an engine assembly 11.

Figure 6:
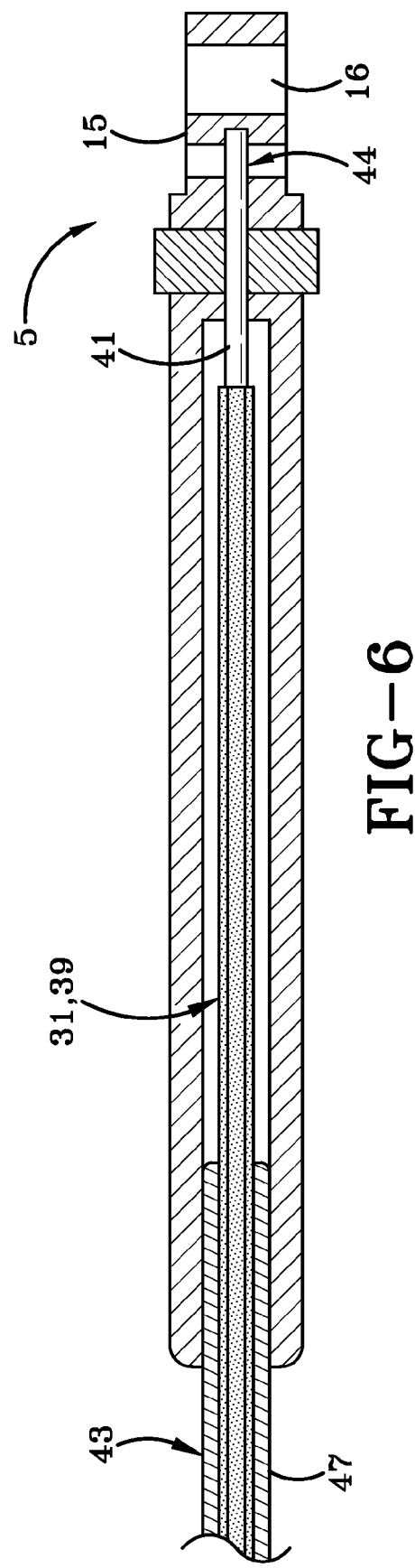
FIG. 6 is a cross-sectional view taken along line 6-6 of FIG. 2.

As shown in FIGS. 2-6, cable assembly 1 includes a broach 12 for use in securing cable assembly 1 to boat 9. Cable assembly 1 further includes a connector 13 having an eyelet 14 disposed generally at first end 3 and a connector 15 having an eyelet 16 disposed generally at second end 5. Connector 13 is partially encapsulated by a sheath 17. As shown in FIG. 4, sheath 17 is coupled at one end with a brace 19. Brace 19 receives a first end 21 of a segment 23 of cable assembly 1. As shown in FIGS. 2 and 5, segment 23 extends from first end 21 to a second end 25 which is received by a brace 27. Segment 23 includes a first cable 29 and a second cable 31 slidably disposed therein. First cable 29 includes a first layer 33, a second layer 35, and a third layer 37. Second cable 31 includes a fourth layer 39 and a fifth layer 41. As shown in FIG. 4, second cable 31 extends beyond first cable 29 at both ends. Specifically, proximate a first end 42 of second cable 31, fourth layer 39 extends into sheath 17 and fifth layer 41 extends beyond fourth layer 39 into connector 13. First end 42 slides within sheath 17 in response to movement of connector 15. Proximate a second end 44 of second cable 31, fourth layer 39 extends into connector 15 with fifth layer 41 extending beyond fourth layer 39 within connector 15. As shown in FIGS. 5 and 6, the portion of second cable 31 extending beyond segment 23 is partially encapsulated by a layer 43, which includes a threaded portion 45 (FIG. 5) and a non-threaded portion (FIGS. 5 and 6). Broach 12 is threadably and rotatably disposed on threaded portion 45.

Figure 7:
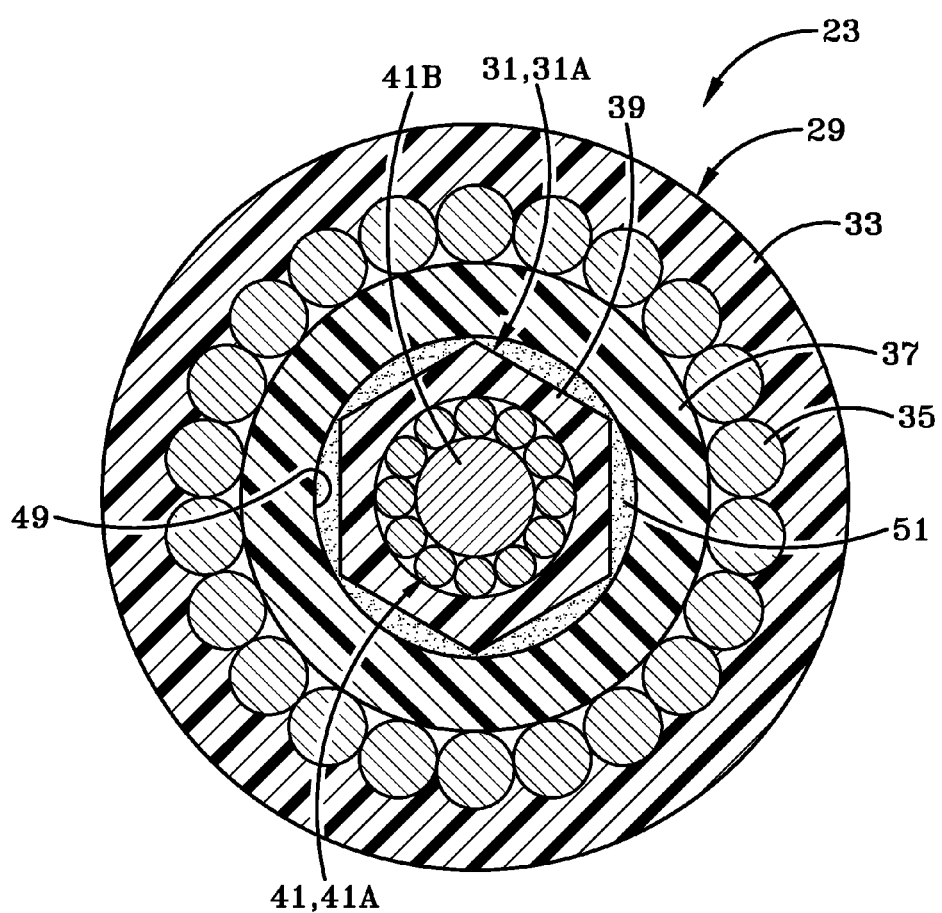
FIG. 7 is a cross-sectional view taken along line 7-7 of FIG. 3 showing a cross-section of a first embodiment of the present invention.
Figure 8:
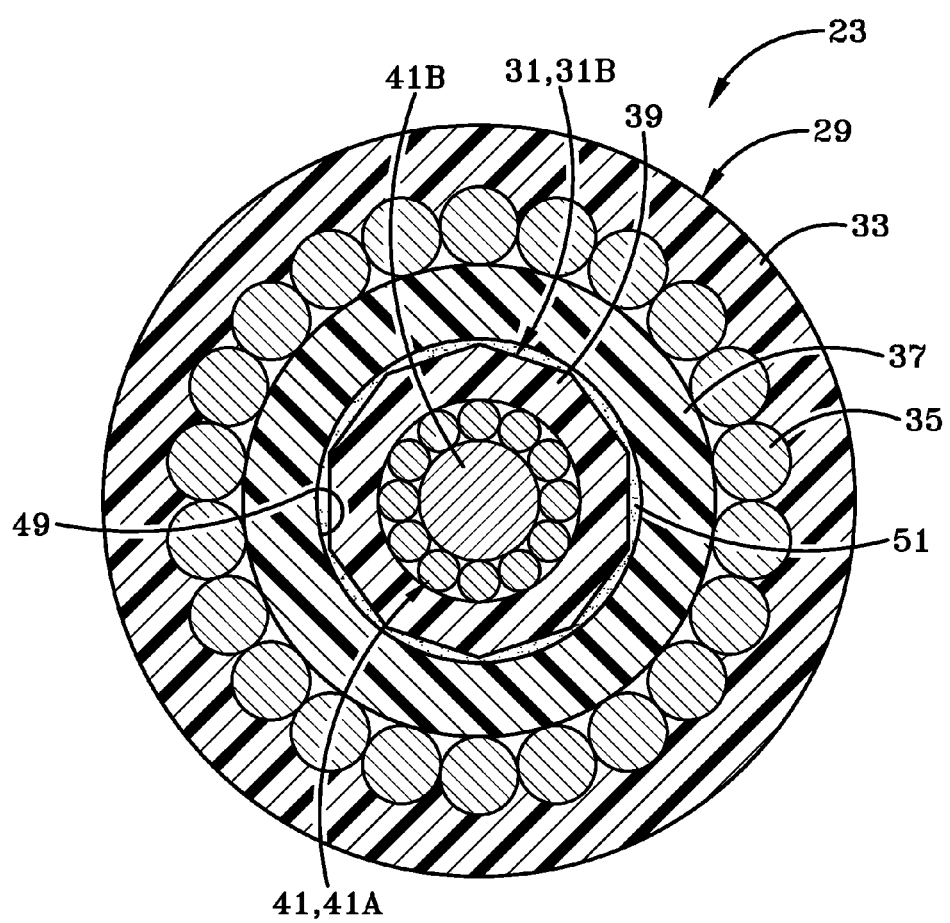
FIG. 8 is a cross-sectional view taken along line 7-7 of FIG. 3 showing a cross-section of a second embodiment of the present invention.
Figure 9:
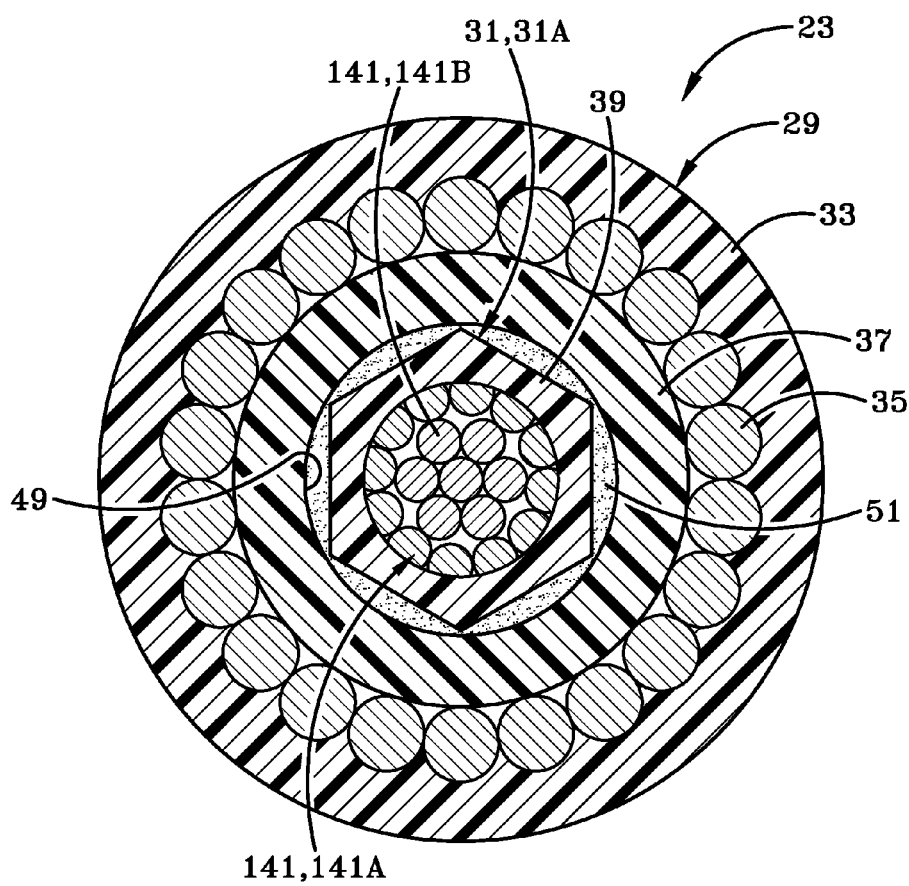
FIG. 9 is a cross-sectional view taken along line 7-7 of FIG. 3 showing a cross-section of a third embodiment of the present invention.

In the embodiments shown in FIGS. 7 and 8, first layer 33, third layer 37, and fourth layer 39 are made from a polymeric material. Polymeric material is generally flexible and light weight. In the embodiments shown in FIGS. 7 and 8, second layer 35 and fifth layer 41 are made from a steel material. Second cable 31 of FIGS. 7 and 8 is known in the art as a 1×13 cable, with one center wire surrounded by twelve outer wires. As shown in FIG. 7, fifth layer 41 may be comprised of a steel inner core layer 41B known as a "king wire" wrapped with steel lay wires 41A for rigidity. The steel material provides rigidity and a sturdy base for the polymeric material. Second cable 31 of FIG. 9 is known in the art as a 1×19 cable, with one smaller inner wire surrounded by eighteen outer wires. In the embodiment shown in FIG. 9, a fifth layer 141 includes a steel inner core 141B wrapped in a plurality of steel lay wires 141A. As shown in FIG. 9, steel inner core 141B is comprised of multiple smaller wires, as opposed to the "king wire" shown as layer 41B in FIG. 7. Further, lay wires 141A have been heavily swaged using hammering and other cold working methods. Lay wires 141A are swaged to be smooth and compressed in order to provide more column strength. Column strength is particularly important for the pushing movement in a push-pull cable. However, by replacing the large "king wire" (layer 41B, FIG. 7) with multiple smaller wires (layer 141B, FIG. 9), the overall flexibility of second cable 31 is improved. Thus, by forming second cable 31 as shown in FIG. 9, the flexibility of second cable 31 is improved via the plurality of smaller wires in layer 141B, and the column strength is improved via the swaging of lay wires 141A.

While FIGS. 7-9 depict different embodiments of second cable 31, the layers and materials described herein are for exemplary purposes only. Any materials or configurations of a cable may be used in first cable 29 or second cable 31 without departing from the spirit of the invention.

As shown in FIG. 7, segment 23 includes a portion of second cable 31 slidably disposed in first cable 29. Pursuant to this, first cable 29 defines an inner channel 49, wherein second cable 31 is disposed in inner channel 49. Inner channel 49 further includes a lubrication material 51 for reducing friction between first cable 29 and second cable 31. First cable 29 is formed to include a first cross-sectional shape. Similarly, second cable 31 is formed to include a second cross-sectional shape. However, as shown in FIG. 7, first cross-sectional shape and second cross-sectional shape are different. First cable 29 is formed having a generally circular cross-sectional shape, wherein second cable 31 is formed having a generally non-circular cross-sectional shape which may be polygonal or a polygon shape. In the embodiment shown in FIG. 7, the non-circular cross-sectional shape is shown as a hexagonal shape, having six sides and six pointed edges running along at least a portion of the length of second cable 31. In the embodiment shown in FIG. 8, the non-circular cross-sectional shape is shown as a decagonal shape, having ten sides and ten pointed edges running along at least a portion of the length of second cable 31.

In operation, a user secures cable assembly 1 to a vehicle, shown in FIG. 1 as boat 9. First end 3 of cable assembly 1 is secured to throttle assembly 7 using connector 13, typically incorporating eyelet 14 into this connection. Second end 5 of cable assembly 1 is similarly connected to engine assembly 11, typically incorporating eyelet 16 into this connection. Thereafter, entire length of cable assembly 1 is secured to the vehicle to reduce any slack or binding therein. Further, throttle assembly 7 and cable assembly 1 are calibrated such that the neutral position of the throttle assembly results in a neutral actuation of engine assembly 11.

After cable assembly 1 is properly secured at first end 3 to throttle assembly 7 and at second end 5 to engine assembly 11, the user may move throttle assembly 7 to actuate engine assembly 11 via cable assembly 1. This actuation is performed by sliding or moving second cable 31 within first cable 29 to thereby actuate engine assembly 11 by either pulling or pushing on a mechanical linkage within engine assembly 11 to actuate a forward or reverse operation of engine assembly 11. More particularly, as shown in FIG. 4 with Arrow A, when a user pushes a portion of throttle assembly 7 forward, second cable 31 slides or moves in a first direction within first cable 29 and actuates engine assembly 11 to propel boat 9 forward. A user may also pull back on a portion of throttle assembly 7 to slide or move second cable 31 in a second direction within first cable 29 which actuates engine assembly 11 to propel boat 9 backwards.

With respect to the present invention, due to the length of cable assembly 1 and this internal sliding motion, a tremendous amount of friction is present between second cable 31 and first cable 29 within inner channel 49. The present invention is directed to reducing friction in this unique environment. As shown in FIG. 7, the cross-sectional shape of second cable 31 is different from the cross-sectional shape of first cable 29. In particular, the cross-sectional shape of first cable 29 is generally circular, wherein the cross-sectional shape of second cable 31 is non-circular. This non-circular shape may be a polygon or a polygonal shape. With respect to the embodiment shown in FIG. 7, second cable 31A includes a hexagon or hexagonal cross-sectional shape having six sides and six edges. This reduces the amount of contact between second cable 31 and first cable 29 within inner channel 49 and results in a lower frictional coefficient between these two elements. Similarly, with respect to the embodiment shown in FIG. 8, second cable 31B includes a decagon or decagonal cross-sectional shape having ten sides and ten edges, which acts to reduce the frictional coefficient between second cable 31B and first cable 29. Lubrication material 51 may be deposited between second cable 31 and first cable 29 to further reduce the frictional coefficient between these two elements. Overall, this facilitates a finer control of engine assembly 11 by a user via throttle assembly 7 and reduces wear on all of the materials used in the formation of cable assembly 1.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A cable assembly including:
   a first cable, wherein the first cable defines an inner channel;
   a second cable slidably disposed in the inner channel; and
   wherein the second cable includes a generally non-circular polygonal cross-sectional shape;
   wherein the first cable includes a generally circular cross-sectional shape;
   a first end of the second cable;
   a first connector secured to the first end of the second cable;
   a sheath enclosing the first end of the second cable; and
   wherein the first end of the second cable slidably moves within the sheath.

2. The cable assembly of claim 1, further including a lubrication material disposed in the inner channel.

3. The cable assembly of claim 1, wherein the polygonal cross-sectional shape is one of a hexagon shape and a decagon shape.

4. The cable assembly of claim 3,
   wherein the first cable further includes a first layer, a second layer, and a third layer;
   wherein the second cable further includes a fourth layer and a fifth layer;
   wherein the first layer, third layer, and fourth layer is made from a polymeric material; and
   wherein the second layer and fifth layer is made from a steel material.

5. The cable assembly of claim 4, wherein the fifth layer is a 1×19 swaged cable.

6. The cable assembly of claim 5, further comprising a second connector disposed proximate a second end of the cable assembly and wherein the first connector is disposed proximate a first end of the cable assembly.

7. The cable assembly of claim 6, wherein the first cable includes a first length, wherein the second cable includes a second length, and wherein the first length is shorter than the second length.

8. The cable assembly of claim 1, in combination with a vehicle including a throttle assembly and an engine assembly, the combination comprising:
   a first end of the cable assembly coupled with the throttle assembly; and
   a second end of the cable assembly coupled with the engine assembly.

9. The combination of claim 8, wherein the vehicle is a boat.

10. A method for forming a cable assembly, the method comprising the steps of:
    forming an inner channel inside a first cable, wherein the inner channel includes a generally circular cross-sectional shape;
    disposing a second cable having a non-circular polygonal cross-sectional shape inside the inner channel;
    wherein the second cable includes one of a hexagonal cross-sectional shape and a decagonal cross-sectional shape; and
    sliding the second cable in the inner channel.

11. The method of claim 10, further comprising the step of depositing a lubrication material between the first cable and the second cable.

12. The method of claim 10, further comprising the step of forming the first cable and the second cable in different lengths.

13. The method of claim 10, further comprising the steps of:
    forming a first portion of the first cable with a polymeric material;
    forming a second portion of the second cable with the polymeric material; and
    abutting the first portion with the second portion.

14. The method of claim 13, further comprising the step of surrounding a swaged 1×19 cable with the second portion.

15. The method of claim 10, further comprising the steps of:
    connecting a first end of the cable assembly to a throttle assembly;
    connecting a second end of the cable assembly to an engine assembly; and
    moving a portion of the throttle assembly to slide the second cable in the inner channel and thereby actuate the engine.

16. A segment of a cable assembly, the segment including:
    a first cable having a first cross-sectional shape;
    an inner channel defined by the first cable;
    a second cable having a second cross-sectional shape, wherein the second cable is slidably disposed in the inner channel;
    wherein the first cross-sectional shape and the second cross-sectional shape are different;
    wherein the second cross-sectional shape is non-circular;
    wherein the second cross-sectional shape is a polygon; and
    wherein the second cross-sectional shape is one of a hexagon shape and a decagon shape.

17. The segment of claim 16, further comprising a lubrication material disposed between the first cable and the second cable.

18. The segment of claim 16, wherein the second cable includes a swaged 1×19 cable surrounded by a polymeric material.

19. The segment of the cable assembly of claim 16, in combination with a vehicle including a throttle assembly and an engine assembly, the combination comprising:
    a first end of the cable assembly coupled with the throttle assembly; and
    a second end of the cable assembly coupled with the engine assembly.

20. The combination of claim 19, wherein the vehicle is a boat.

* * * * *